Aug. 12, 1924.
J. C. GALLAGHER
1,504,684
TRANSMISSION
Filed July 21, 1923
2 Sheets-Sheet 1
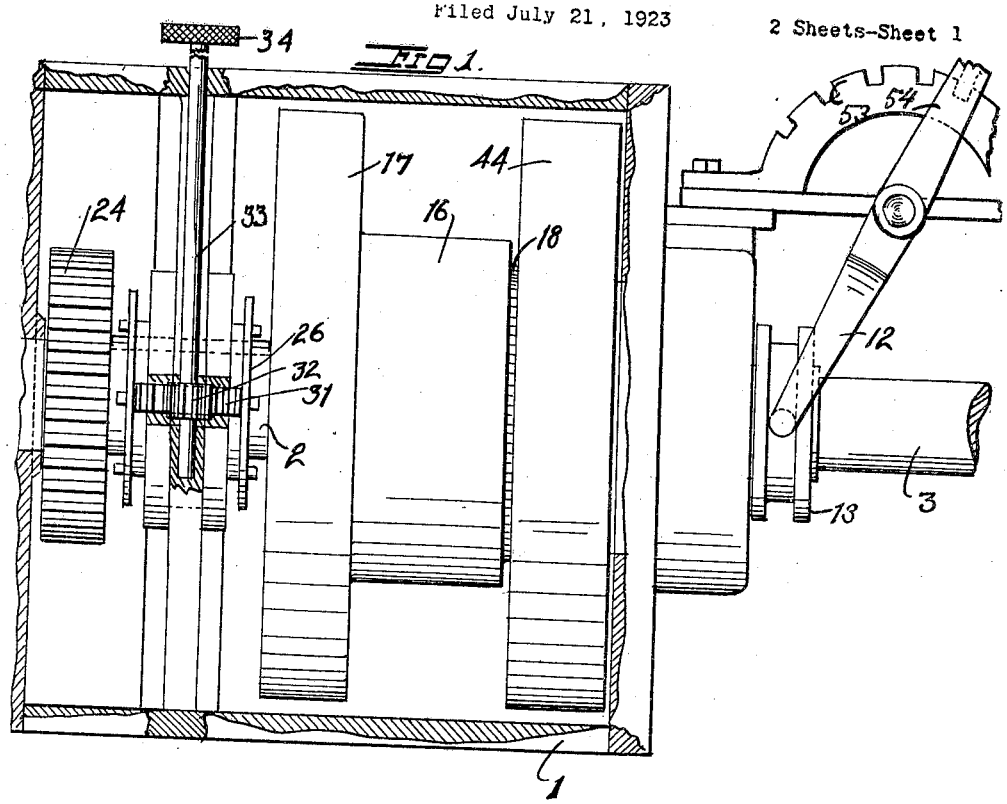
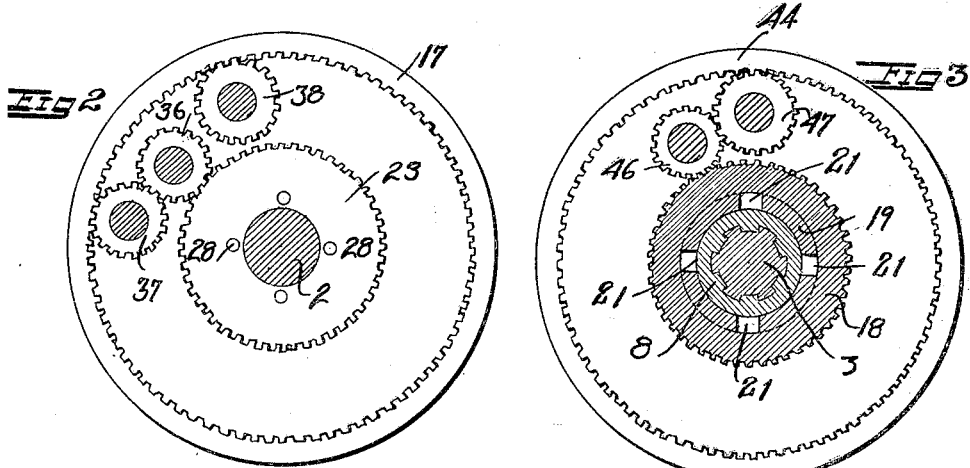
INVENTOR.
J. C. Gallagher
BY Munn & Co.
ATTORNEYS Aug. 12, 1924.
J. C. GALLAGHER
1,504,684
TRANSMISSION
Filed July 21, 1923    2 Sheets-Sheet 2
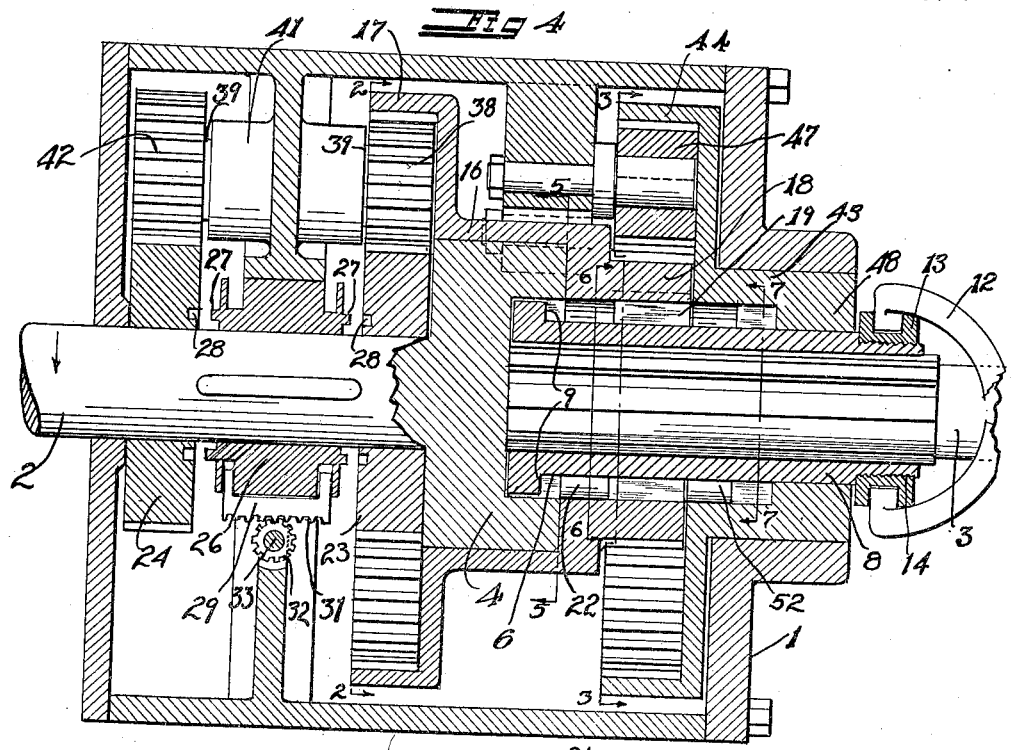
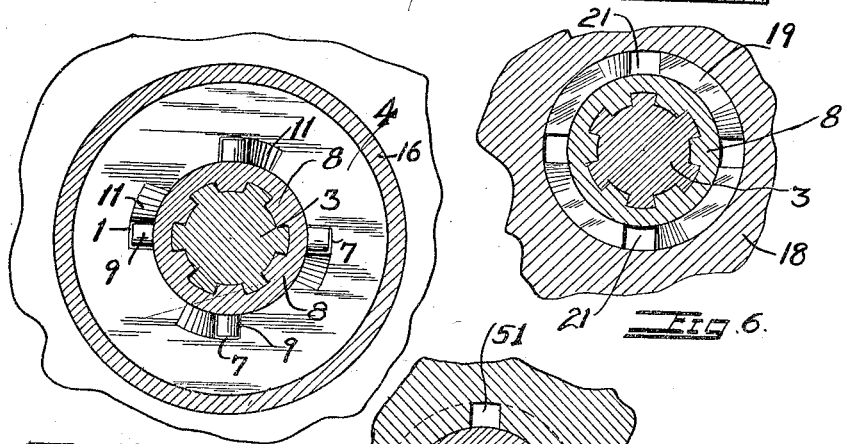
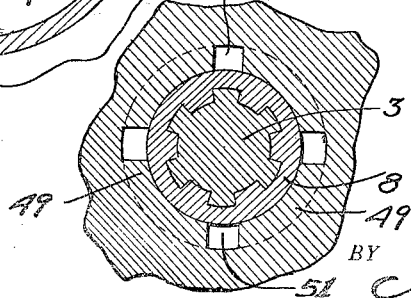
INVENTOR.
J. C. Gallagher
BY
ATTORNEYS Patented Aug. 12, 1924.

1,504,684

UNITED STATES PATENT OFFICE.

JOSEPH C. GALLAGHER, OF RENO, NEVADA, ASSIGNOR OF ONE-EIGHTH TO FRANK KNOWLES, OF RENO, NEVADA, ONE-EIGHTH TO PATRICK SALMON, OF SAN FRANCISCO, CALIFORNIA, AND ONE-EIGHTH TO R. E. VICE, OF VIRGINIA CITY, NEVADA.

TRANSMISSION.

Application filed July 21, 1923. Serial No. 652,982.

*To all whom it may concern:*

Be it known that I, JOSEPH C. GALLAGHER, a citizen of the United States, and a resident of Reno, county of Washoe, and State of Nevada, have invented a new and useful Transmission, of which the following is a specification.

The present invention relates to improvements in transmissions and has reference more particularly to a change speed transmission used for motor vehicles. The principal object of the invention is to provide a novel change speed transmission which allows the speed of the vehicle to be changed without disengaging the clutch commonly provided in motor vehicles. It is further proposed to provide a change speed transmission that is very compact, can be arranged to allow of any desired number of different speeds and makes provision for reverse motion as well as for forward motion. It is further proposed to provide means facilitating the engagement between a driving member and a driven member. Further objects and advantages of my device will appear as the description proceeds.

The preferred form of my invention is illustrated in the accompanying drawings, in which Figure 1 shows a side view of my change speed transmission, part of the box being broken away to disclose the interior; Figure 2 a sectional detail view taken along line 2—2 of Figure 4; Figure 3 a sectional detail view taken along line 3—3 of Figure 4; Figure 4 a horizontal section through the transmission box; Figure 5 a sectional detail view taken along line 5—5 of Figure 4; Figure 6 a sectional detail view taken along line 6—6 of Figure 4, and Figure 7 a sectional detail view taken along line 7—7 of Figure 4. While I have shown only the preferred form of the invention I wish to have it understood that various changes and modifications may be made within the scope of the claims hereto attached without departing from the spirit of the invention.

Referring to the drawings in detail it will be seen that a rectangular box (1) of any suitable construction is used to enclose the moving parts of the transmission. The drive shaft (2) may be considered as being driven by the engine shaft, preferably through a clutch not shown in the drawing. Alined with the drive shaft is the driven shaft (3) transmitting power to the rear axle preferably through a differential arrangement not shown in the drawing. The drive shaft (2) terminates in a head (4) provided with a cylindrical recess (6) in its rear face and with a plurality of smaller recesses (7) extending radially from the main recess (6). These recesses are adapted to be engaged by the sleeve (8) slidably mounted on the driven shaft (3) and by studs (9) projecting radially from the said sleeve. To facilitate the engagement while the shafts are rotating I provide slanting planes (11) leading into the recesses (7) so that when the drive shaft (2) is rotating and the sleeve (8) is idle or is rotating at a different speed and is forced against the face of the head (4) the studs (9) will naturally follow the path of the slanting planes (11) and enter the recesses (7) so as to cause the sleeve (8) to rotate at the same speed as the drive shaft (2). The sleeve may be slid back and forth on the driven shaft (3) by means of the forked member (12) engaging a grooved collar (13) threaded on the sleeve as shown at (14).

The engagement thus far described constitutes a direct drive between the two shafts. Transmission at intermediate speed is secured through the member (16) mounted rotatably on the head (14) and terminating at one end in a large ring gear (17) and at the other end in a cylinder (18) having internal flanges (19) corresponding in shape to the outlines of the head of the drive shaft and defining recesses or grooves (21) adapted to receive the studs (9) projecting from the sleeve (8). A neutral space (22) is left between the head (4) and the flanges (19) of sufficient length to accommodate the studs (9) so that when the latter studs are moved from the engagement with the head to the engagement with the flanges (9) they pass through a neutral space and clear for a short period of time both the head (4) and the flanges.

The member (16) is rotated by the drive shaft (2) in the following manner: The latter has rotatably mounted thereon two gear wheels (23) and (24) with a slide (26) disposed between the same. The latter slide has teeth (27) projecting from either end which are adapted to engage with registering recesses (28) in the faces of the gear wheels so that either gear wheel may be made to rotate with the shaft by pushing the sliding member (26) to the right or to the left as viewed in Figure 4. This pushing motion may be executed by means of the forked member (29) engaging the slide and provided with a rack (31) adapted to be engaged by the pinion (32) on the rod (33) which latter extends upwardly through the box and the bottom of the car body and is provided at its upper end with a milled head (34).

The gear wheel (23) is disposed in the same plane as the ring gear (17) and motion is transmitted from the said gear wheel to the ring gear by means of two interlocking pinions (36) and (37) as shown in Figure 2 so that the ring gear turns in the same direction as the gear (23) but at a slower speed. The ring gear (17) further meshes with a pinion (38) supported on a shaft (39) journaled in the fixed bearing (41) and the far end of the shaft (39) is provided with a pinion (42) meshing with the gear wheel (24). It will be noted from Figure 2 that the pinion (38) does not engage with the gear wheel (23) but receives its rotary motion from the pinion (42) which latter is in mesh with the gear wheel (24) and that the rotary motion is in the opposite direction to that transmitted from the gear wheel (23).

The operation of the device thus far disclosed is as follows: The drive shaft (2) receives its rotary motion from the engine. The sliding member (26) rotates with the drive shaft irrespective of its position. When pushed to the right, as viewed in Figure 4, it causes the gear wheel (23) to rotate at the same speed, which latter transmits its rotary motion at a slower speed but in the same direction to the ring gear (17). When in this position the pinion (38) idles, causing the pinion (42) and the gear wheel (24) to follow its motion. When the sliding member (26) is pushed to the left it engages the gear wheel (24) which latter causes the pinion (42) and the coaxial pinion (38) to rotate, thereby transmitting a rotary motion to the ring gear (17) at a reduced speed and in the opposite direction.

When the sleeve (8) is in the position shown in Figure 4 it directly engages with the drive shaft (2) and causes the driven shaft (3) to rotate at the same speed as the drive shaft. As the sleeve is pulled rearwardly the studs (9) pass through the neutral space (22) and while occupying said space the sleeve is disconnected from the engine shaft. If the pull is continued the studs (9) enter into engagement with the flanges (19) and thereupon cause the sleeve to rotate at the same speed as the member (16), that is, in the same direction as the drive shaft if the slide (26) is pushed to the right or in the opposite direction if the slide (26) is pushed to the left. This position of the sleeve (8) would indicate intermediate or second speed, while the direct connection represents high speed.

For low speed a second member (43) is provided, which comprises a ring gear (44) receiving rotary motion from the member (16) through the two pinions (46) and (47) as shown in Figure 3 the teeth of the pinion (46) meshing with the gear teeth on the cylinder (18) and terminates at the rear end in a cylindrical portion (48) mounted rotatably on the sleeve (8). The cylindrical portion (48) is provided with flanges (49) leaving recesses (51) between the same adapted to be engaged by the studs (9) when the sleeve (8) is pushed backwards still further. It should be noted that the studs before reaching the recesses (51) pass through a neutral zone (52) which allows the studs to clear the flanges on both sides.

The member (43) rotates at a lower speed than the member (16) due to the transmission of rotary motion through the two pinions (46) and (47) and turns in the same direction so that when the studs (9) are engaged with the flanges (49) the sleeve (8) will rotate at low speed, the direction of rotation depending upon the position of the slide (26). When the latter is moved to the right the sleeve (8) will rotate in the same direction as the drive shaft and if the slide (26) is moved to the left the sleeve (8) will rotate in the opposite direction.

It will be noted that the sleeve (8) may occupy five different positions, two of which are neutral. To facilitate the handling of the machine a quadrant (53) may be secured in the manner shown in Figure 1 and notched to indicate proper stops for the lever (54) actuating the grooved collar (13). The notches may be suitably marked as for instance L, N, 2d, N, H; indicating low, neutral, second speed, neutral and high speed.

I claim:

1. In a change speed transmission, a drive shaft, a driven shaft alined therewith, a sleeve slidable on the driven shaft having means thereon for directly engaging the drive shaft, a member surrounding both the drive shaft and the sleeve, two gear wheels rotatable on the drive shaft in spaced relation, an element slidable between the gear wheels adapted to be engaged with either of them for rotating the same, means for transmitting motion to the said member from the gear wheels in opposite directions and means for transmitting motion from the said member to the sleeve when the latter is slid backwardly.

2. In a change speed transmission, a drive shaft, a driven shaft alined therewith, a sleeve slidable on the driven shaft having means thereon for directly engaging the drive shaft, a member surrounding both the drive shaft and the sleeve, two gear wheels rotatable on the drive shaft in spaced relation, an element slidable between the gear wheels adapted to be engaged with either of them for rotating the same having a rack thereon, a pinion engaging the rack for actuating the same, means for transmitting motion to the said member from the gear wheels in opposite directions and means for transmitting motion from the said member to the sleeve when the latter is slid backwardly.

3. In a change speed transmission, a drive shaft, two gear wheels rotatable thereon in spaced relation, a sliding member on the shaft adapted to be selectively engaged with either gear wheel for transmitting motion thereto, an internal gear surrounding one of the gear wheels, means for transmitting motion thereto from the said gear wheel and means for transmitting motion to the internal gear from the other gear wheel in the opposite direction.

4. In a change speed transmission, a drive shaft, two gear wheels rotatable thereon in spaced relation, a sliding member on the shaft adapted to be selectively engaged with either gear wheel for transmitting motion thereto, and internal gear surrounding one of the gear wheels, means for transmitting motion to the internal gear from the other gear wheel in the opposite direction comprising a jack shaft having a pinion thereon meshing with the internal gear and a second pinion meshing with the second gear wheel.

5. In a change speed transmission, a driving member, a sliding member mounted coaxially therewith for end to end engagement, and means for engaging the sliding member with the driving member comprising radial projections on one of the members engaging registering recesses of the other member, the recesses having slanting planes leading thereinto for facilitating the engagement.

6. In a change speed transmission, a drive shaft, a driven shaft alined therewith, a sleeve slidable on the driven shaft having means thereon for directly engaging the drive shaft, a member surrounding both the drive shaft and the sleeve, means for transmitting motion to the same from the drive shaft, a second member surrounding the first member and the sleeve, means for transmitting motion to the second member from the first member, and means for engaging the sleeve with either of the two members by sliding the same rearwardly.

7. In a change speed transmission, a drive shaft, a driven shaft alined therewith, a sleeve slidable on the driven shaft having means thereon for directly engaging the drive shaft, a member surrounding the sleeve having an internal gear extending over the drive shaft, means for transmitting motion to the ring gear from the drive shaft and means for engaging the sleeve with the said member when the sleeve is slid rearwardly.

8. In a change speed transmission, a drive shaft, a driven shaft alined therewith, a sleeve slidable on the driven shaft having means thereon for directly engaging the drive shaft, a member surrounding the sleeve having an internal gear extending over the drive shaft, means for transmitting motion to the ring gear from the drive shaft and means for engaging the sleeve with the said member when the sleeve is slid rearwardly with a neutral space interposed between the two engagements.

9. In a change speed transmission, a drive shaft, a driven shaft alined therewith, a sleeve slidable on the driven shaft having means thereon for directly engaging the drive shaft, a member surrounding the sleeve having an internal gear extending over the drive shaft, means for selectively transmitting motion in opposite directions to the ring gear from the drive shaft and means for engaging the sleeve with the said member when the sleeve is slid rearwardly.

JOSEPH C. GALLAGHER.